Jan. 8, 1935.  W. D. UNDERWOOD  1,987,087
OVEN
Filed Jan. 21, 1931  2 Sheets-Sheet 1

Inventor
William D. Underwood
by Rippey & Kingsland
His Attorneys

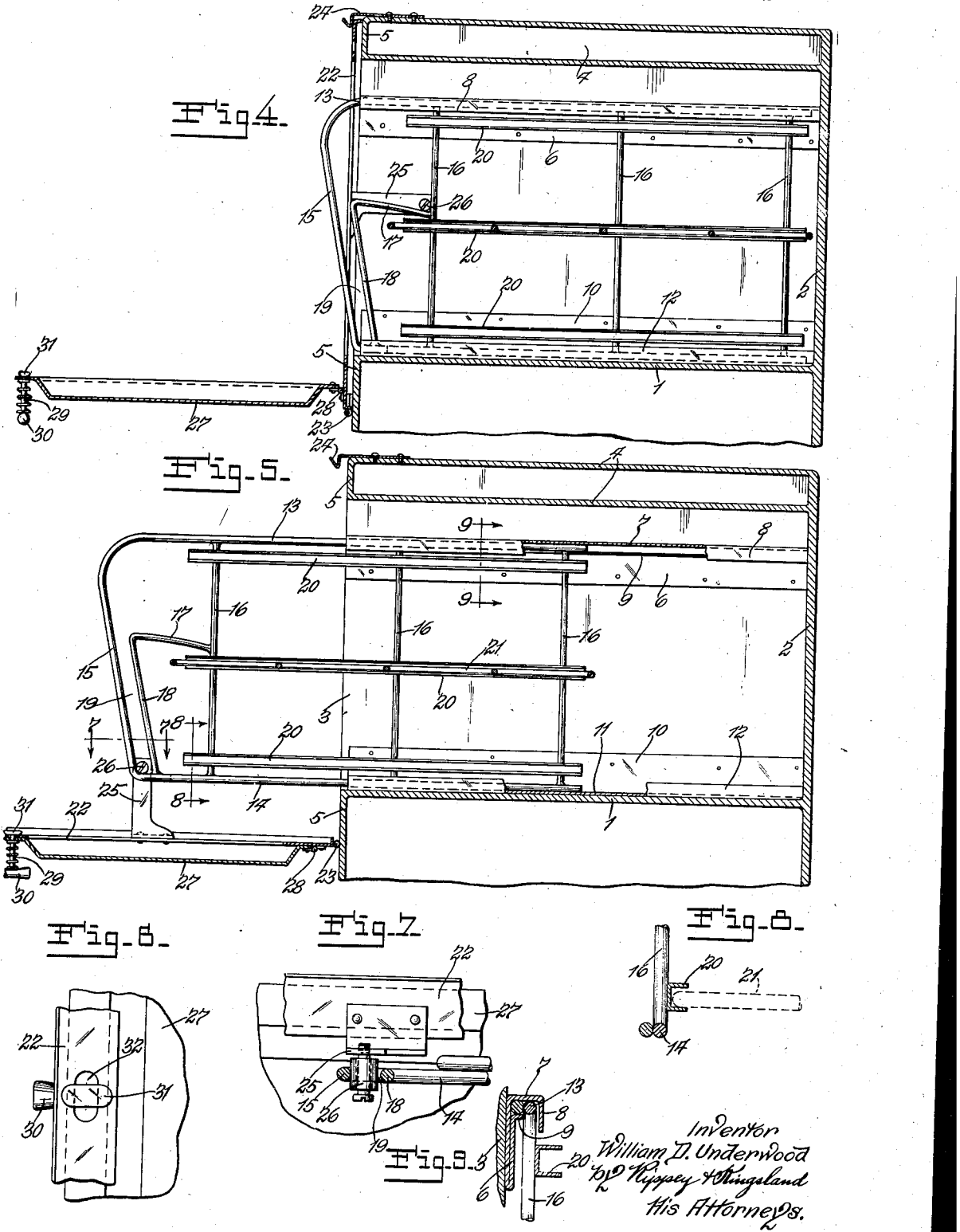

Patented Jan. 8, 1935

1,987,087

UNITED STATES PATENT OFFICE 1,987,087

OVEN

William D. Underwood, Valley Park, Mo.

Application January 21, 1931, Serial No. 510,069

10 Claims. (Cl. 126—340)

This invention relates to improvements in ovens; and has special reference to mechanism controllable optionally when the door is opened to withdraw the contents of the oven or not, as desired.

An object of the invention is to provide an oven with an oven door and with means within the oven for supporting the contents of the oven, in combination with devices controllable optionally to withdraw from the oven said supports and the contents thereof whenever the oven door is opened or to leave said supports and the contents of the oven entirely within the oven when the oven door is opened, as desired.

Another object of the invention is to provide an improved oven with sliding supports therein for supporting the contents of the oven, and with an oven door, in combination with a frame hinged to the side of the oven, and means for holding said frame in idle position against the side of the oven or swinging said frame outwardly with the oven door when said door is opened, as desired.

Various other objects and advantages of the invention will appear from the following description, reference being made to the accompanying drawings, in which—

Fig. 4 is an enlarged vertical front to rear sectional view of the oven on the line 4—4 of Fig. 2.

Fig. 5 is a similar sectional view showing the auxiliary door frame swung outwardly and the supporting frames in the oven in their outward positions.

Fig. 6 is a view showing the device for engaging the door with the swinging door frame in order to operate said frame with the door.

Fig. 7 is an enlarged detail sectional view on the line 7—7 of Fig. 5.

Fig. 8 is a sectional view on the line 8—8 of Fig. 5.

Fig. 9 is a sectional view on the line 9—9 of Fig. 5.

Figure 1:
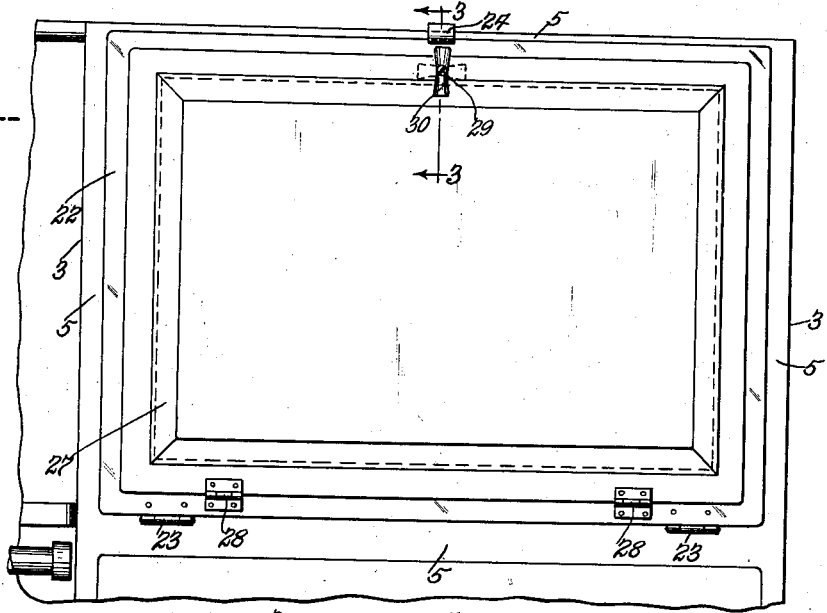
Fig. 1 is a front elevation of an oven embodying the present invention.
Figure 2:
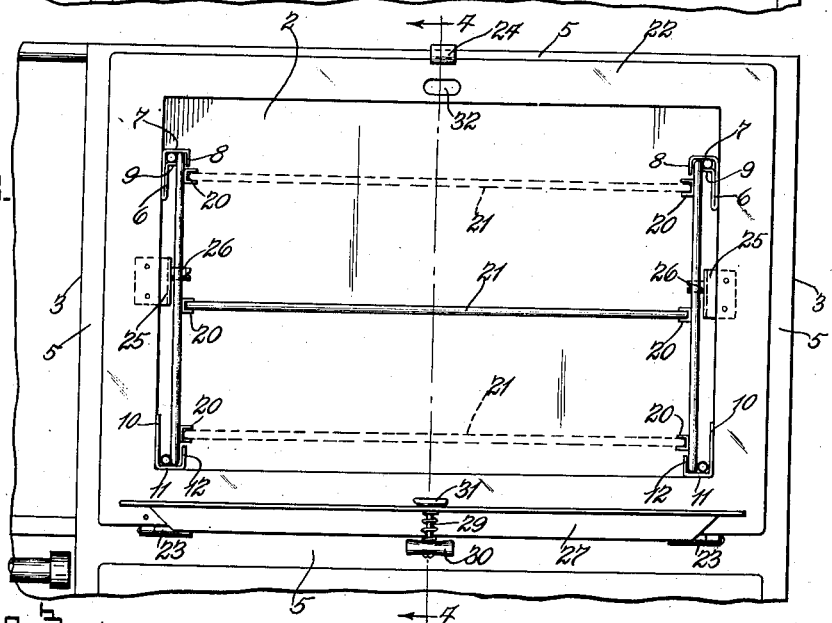
Fig. 2 is a similar view with the oven door open.
Figure 3:
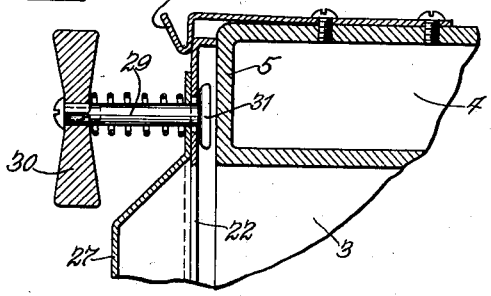
Fig. 3 is an enlarged sectional view on the line 3—3 of Fig. 1.

The present invention is embodied in an oven comprising a bottom wall 1, a rear wall 2, side walls 3 and top wall structure 4. This provides an oven open at the front, the bottom, side and top walls being shaped to provide a door frame 5. Each of the side walls supports guides for the movable frames comprised within the present invention. There are two upper guides and two lower guides, each upper guide comprising a member shaped to provide a vertical portion 6 attached to the side wall and having an inwardly extended portion 7 provided at its inner edge with a downwardly extended flange 8. The vertical portions 6 are also provided with inwardly extended flanges 9 spaced below the parts 7 and having their edges terminating at a distance from the flanges 8. These guides extend rearwardly from the front of the oven.

Each lower guide comprises a vertical portion 10 attached to the side walls 3, an inwardly extended portion 11 and an upwardly extended flange 12. These guides also extend rearwardly from the front of the oven.

The movable frames are preferably of skeletonized form, each comprising a rod bent to form an upper portion 13, a lower portion 14 and a front portion 15 connecting the front ends of the parts 13 and 14. The parts 13 and 14 are connected at intervals by vertical wires or rods 16. Each frame also includes a wire bent to form an upper portion 17 having its rear end attached to the front rod 16, and a downwardly extended portion 18 having its lower end attached to the frame part 14. The frame members 15 and 18 are spaced apart to provide slots 19.

These frames are mounted to slide in the guides that are attached to the side walls of the oven, the upper portions 13 of the frames being mounted in the upper guides and the lower portions 14 of the frames being mounted in the lower guides. These frames are freely slidable in the guides and may be moved from their inner positions shown in Fig. 4 to their outer positions shown in Fig. 5 of the drawings.

To each of the movable frames a number of horizontal channel members 20 are attached. The channels of these channel members 20 open inwardly toward each other and are designed and adapted to receive removable and interchangeable frames 21 constituting supports for the cooking utensils placed within the oven. A frame 22 is connected to the lower part of the oven frame 5 by hinges 23, permitting said frame 22 to be swung from position in which it seats against the oven frame 5 entirely around the opening into the oven and to position outwardly therefrom. A latch device 24 in connection with the top wall structure 4 is arranged to engage the upper portion of the frame 22 and hold it in closed position against the oven frame 5. The frame 22 has a pair of arms 25 attached thereto and extending inwardly. Each arm 25 extends along said adjacent movable frame above described and supports a roller 26 extending inwardly and arranged to roll along the frame part 17 and against the frame part 15. In the idle or closed position of the frame 22, the roller 26 engages against the front frame member 16. When the frame 22 is swung outwardly and downwardly, the roller 26 operates along the frame part 17 and finally engages the frame part 15 and passes downwardly into the space 19. In the lower position of the frame 22, the roller 26 engages upon the frame part 14 and thus supports the frame 22 in approximately horizontal position. When the frame 22 is moved from open to closed position, the rollers 26 roll along and push against the frame parts 18 and thereby push the movable frames rearwardly into the oven automatically and as an incident to the closing of the door frame 22.

A door 27 is connected to the lower part of the frame 22 by hinges 28. These hinges 28 constitute supports for the oven door 27 and also permit said oven door to be opened while the frame 22 remains in closed position and without moving the sliding frames outwardly.

The upper portion of the oven door supports a rotary rod 29 having on its outer end a handle 30 for manual engagement and operation and on its inner end an elongated piece 31. The frame 22 has an elongated slot 32 through which the piece 31 may pass when said piece 31 is turned horizontally. When the piece 31 is turned vertically, it will extend across the slot 32 and engage the frame 22 and thereby support the oven door 27 in closed position. By turning the handle 30, the rod 29 may be turned to position to permit the piece 31 to be withdrawn through the slot 32 or to be passed inwardly through said slot.

In use, the oven door 27 is held against the frame 22 by engaging the latch piece 31 in the position shown in Fig. 6 of the drawings. If it is desired to open the oven door and withdraw the movable frames and the cooking utensils thereon, the handle 30 is engaged and drawn outwardly with sufficient force to disengage the frame 22 from the latch 24, thus swinging the frame 22 outwardly and drawing with it the movable frames in the oven, as desired. The oven door will continue to swing outwardly and downwardly and move outwardly the movable frame, until the oven door is stopped by engagement of the rollers 26 with the lower frame members 14.

When the oven door is closed, the rollers 26 push against the frame members 18 and shove the movable frames inwardly into the oven and eventually pass above the frame members 17. Continued movement of the oven door toward closed position engages the frame 22 with the latch 24.

My invention has many advantages. By thus withdrawing the cooking utensils from the oven, they may be engaged for removal, or inspected, or turned to different positions without the slightest danger of burning the hands. My invention makes it unnecessary to extend the hands into the oven but brings the contents of the oven outwardly into convenient engagement for removal, or adjustment, and for inspection, without the slightest inconvenience and without the slightest damage to the contents in the cooking utensils.

The construction and arrangements of the parts of the oven may be varied widely within equivalent limits without departure from the nature and principle of the invention. I do not restrict myself unessentially, but what I claim and desire to secure by Letters Patent is:

1. In an oven having an opening at the front, a frame hinged to said oven for swinging movements outwardly from position against the front of the oven around said opening, a door hinged to said frame for swinging movements independently of or jointly with said frame, as desired, to open and to close said opening, a movable support in said oven for supporting cooking utensils, and means operated by said frame for moving said support outwardly to position to extend beyond the front of the oven when said frame is moved outwardly with said door.

2. In an oven having an opening at the front, a frame hinged to said oven for swinging movements outwardly from position against the front of the oven around said opening, means for holding said frame against the oven, a door, hinges supporting said door on said frame, a device for operating said frame outwardly with said door for permitting said door to swing outwardly independently of said frame, as desired, a movable support in said oven for supporting cooking utensils, and means operated by said frame for moving said support outwardly to position to extend beyond the front of the oven when said frame is swung outwardly with said door.

3. In an oven having an opening at the front, a frame hinged to said oven for swinging movements outwardly from position against the front of the oven around said opening, means for holding said frame against the oven, a door, hinges supporting said door on said frame, a device for operating said frame outwardly with said door for permitting said door to swing outwardly independently of said frame, as desired, a movable support in said oven for supporting cooking utensils, means operated by said frame for moving said support outwardly to position to extend beyond the front of the oven when said frame is swung outwardly with said door, and means for supporting said support in different vertical positions in said oven.

4. In an oven having an opening at the front, a frame bordering said opening and abutting against the front of the oven, hinges for supporting said frame for downward and outward swinging movements, a device for holding said frame in vertical position against the front of the oven, a door hinged to said frame for downward and outward swinging movements with or independently of said frame, as desired, means mounted on said door for moving said frame therewith when it is desired to move said frame downwardly and outwardly with said door and for permitting said frame to remain stationary when said door is swung downwardly and outwardly, as desired, a support in said oven for supporting cooking utensils, and means operated by said frame for moving said support outwardly to extend beyond the front of the oven when said frame is operated outwardly by said door.

5. In an oven having an opening at the front, a frame hinged to said oven and bordering said opening and having an opening therethrough opening into said oven, a door hinged to said frame for opening and closing said opening therethrough, optional means for swinging said frame outwardly with said door or leaving said frame stationary when said door is opened, as desired, a support in said oven for supporting cooking utensils, and means operated by said frame for moving said support outwardly to position to extend beyond the front of the oven when the door is opened.

6. In an oven having an opening at the front, a frame hinged to said oven and bordering said opening and having an opening therethrough opening into said oven, a door hinged to said frame for opening and closing said opening therethrough, optional means for swinging said frame outwardly with said door or leaving said frame stationary when said door is opened, as desired, a support in said oven for supporting cooking utensils, means operated by said frame for moving said support outwardly to position to extend beyond the front of the oven when the door is opened, and means for supporting said support at different heights in said oven.

7. In an oven having an opening at the front, a frame hinged to said oven, a device for holding said frame against the oven around said opening, a pair of vertical sliding frames within the oven, a support for cooking utensils, means in connection with said frames for supporting said support at different heights in the oven, means operated by said first frame for moving said sliding frames outwardly when said first frame is swung outwardly, a door hinged to said first frame, and optional means for swinging said first frame outwardly with said door or leaving said first frame stationary when said door is swung outwardly, as desired.

8. In an oven having an opening at the front, a pair of sliding frames mounted in said oven, a device carried by said frames for supporting cooking utensils, a swinging frame hinged to the front of the oven for outward swinging movements from position against the oven, connections for moving said sliding frames by said last named frame, a door hinged to said last named frame, and optional means for operating said last named frame by said door or permitting said door to be opened while said last named frame remains stationary, as desired.

9. In an oven having an opening at the front, a door hinged at its lower edge for vertical swinging movements to positions to close and to open said opening, a pair of frames supported in said oven for forward and rearward sliding movements, a support for cooking utensils mounted on said frames, a member operative optionally by said door for moving said frames outwardly to position to extend beyond the front of the oven or not, as desired, when the door is opened, means releasably engaging and holding said member stationary in the position it occupies when said frames are within the oven, and a device supported by the door for engaging said member and holding said door in closed position and for moving said member with the door when the door is moved to open position.

10. In an oven having an opening at the front, a door hinged at its lower edge for vertical swinging movements to positions to close and to open said opening, a pair of frames supported in said oven for forward and rearward sliding movements, a support for cooking utensils mounted on said frames, a member hinged to said oven and operative optionally by said door for moving said frames outwardly to position to extend beyond the front of the oven or not, as desired, when the door is opened, connections for moving said frames by said member during the final portion of the outward movement of said member and leaving said frames stationary during the initial outward movement of said member, means releasably engaging and holding said member stationary in the position it occupies when said frames are within the oven, and means for operating said member by said door.

WILLIAM D. UNDERWOOD.